UNITED STATES PATENT OFFICE.

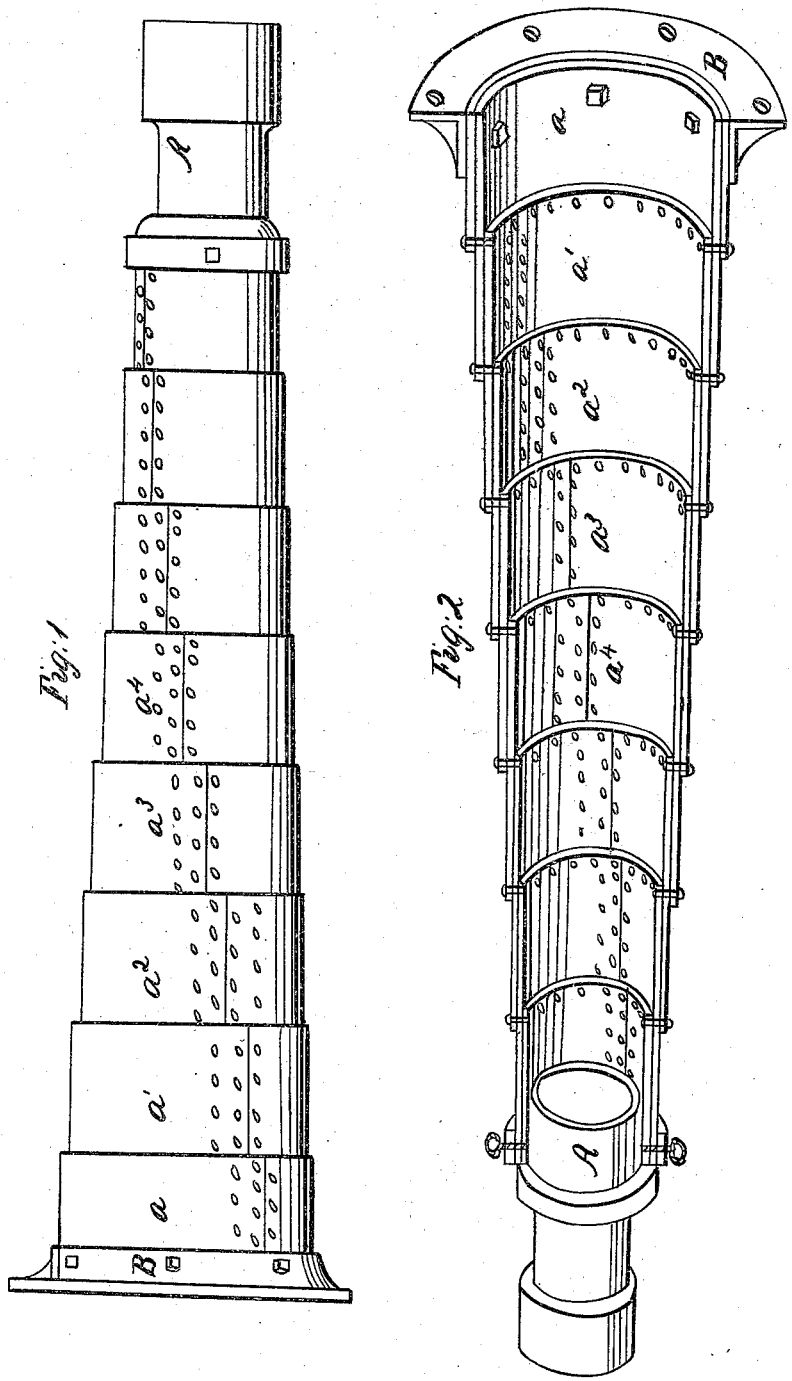

CHAS. F. FISHER, OF NEW ORLEANS, LOUISIANA.

METHOD OF MAKING SHAFTS, &c., OF SHEET-IRON.

Specification of Letters Patent No. 7,412, dated June 4, 1850.

*To all whom it may concern:*

Be it known that I, CHARLES F. FISHER, of New Orleans, county of Orleans, and State of Louisiana, have invented certain Improvements in Hollow Wrought-Iron Shafts, and that the following is a full, clear, and exact description of the principle or character which distinguishes it from all other things before known and of the usual manner of making and using the same, reference being had to the accompanying drawings, of which—

Figure 1 is a view of a shaft, and Fig. 2 a section of the same.

In many situations it is highly desirable to have the shafts of steam engines, water wheels, and the machinery of the greatest possible lightness compatible with their strength and stiffness.

My invention consists in the construction of a shaft which combines these qualities in an eminent degree, and is not expensive in its construction.

It is composed of a number of short cylinders ($a$) of plate iron, similar to that used for making boilers; the size of these cylinders is so graduated that they will each allow of the next in size being slipped within it. For instance ($a'$) is large enough to allow of ($a^2$) being slipped half way within it, and into ($a^2$) is slipped half way ($a^3$) and into that half of ($a^4$) and so on till the desired length is obtained. By this method of construction it will be seen that the shaft is of a double thickness of iron throughout, and at the extremities of each cylinder, where they are riveted together the rivets pass through three thicknesses of iron. The edges of the plates when bent around to form the cylinders, are butted together and riveted through the adjoining cylinders, each one having one half internal and the other half external. The seams are made to break joint with one another, which gives an equal strength to every part. This method of putting cylinders together forms a slightly tapering cone, and when a shaft is made of two such cones with their bases adjoining, it assumes that form which is well known to be the best calculated to resist a transverse strain.

This invention can be applied to connecting rods and other moving parts of machinery, as well as the stationary parts, framing, &c.

A piece of wrought or cast iron forming the journal and the place for setting on a crank, is shown attached to the shaft at (A) and at the other end is shown a flange piece (B) by which the shaft can be bolted to a fly wheel or two such shafts be joined together.

Having thus fully described my improved hollow wrought iron shaft, what I claim as new therein and which I desire to secure by Letters Patent is—

The constructing of hollow plate iron shafts or short cylinders combined and connected together in the manner and for the purposes above described.

CHARLES F. FISHER.

Witnesses:
EDWARD EVERETT,
WM. GREENOUGH.